US007574481B2

(12) United States Patent
Moore et al.

(10) Patent No.: US 7,574,481 B2
(45) Date of Patent: Aug. 11, 2009

(54) METHOD AND SYSTEM FOR ENABLING OFFLINE DETECTION OF SOFTWARE UPDATES

(75) Inventors: Brian J. Moore, Redmond, WA (US); Yan Leshinsky, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 741 days.

(21) Appl. No.: 09/742,795

(22) Filed: Dec. 20, 2000

(65) Prior Publication Data

US 2002/0078142 A1 Jun. 20, 2002

(51) Int. Cl.
G06F 15/16 (2006.01)
G06F 15/00 (2006.01)
G06F 12/00 (2006.01)

(52) U.S. Cl. .................. 709/217; 709/203; 709/219; 707/203; 715/500.1; 717/168; 717/170

(58) Field of Classification Search .............. 709/216, 709/218, 203, 209, 217, 219; 713/200; 707/203; 715/500.1; 717/168, 170
See application file for complete search history.

(56) References Cited

U.S. PATENT DOCUMENTS

| | | | |
|---|---|---|---|
| 4,796,181 A | 1/1989 | Wiedemer |
| 5,047,928 A | 9/1991 | Wiedemer |
| 5,142,680 A | 8/1992 | Ottman et al. |
| 5,155,484 A | 10/1992 | Chambers, IV |
| 5,155,680 A | 10/1992 | Wiedemer |
| 5,155,847 A | 10/1992 | Kirouac et al. |
| 5,267,171 A | 11/1993 | Suzuki et al. |
| 5,337,360 A | 8/1994 | Fischer |
| 5,359,730 A | 10/1994 | Marron |
| 5,367,686 A | 11/1994 | Fisher et al. |
| 5,388,211 A | 2/1995 | Hornbuckle |
| 5,390,247 A | 2/1995 | Fischer |
| 5,421,009 A | 5/1995 | Platt |

(Continued)

FOREIGN PATENT DOCUMENTS

JP 9288572 * 4/1997

(Continued)

OTHER PUBLICATIONS

Bug Net Cybermedia Oil Change Version 2.5, 1998.*

(Continued)

*Primary Examiner*—Tonia L Dollinger
*Assistant Examiner*—David E England
(74) *Attorney, Agent, or Firm*—Merchant & Gould P.C.

(57) ABSTRACT

A method and system that facilitates automatic software updates from an online source such as the Internet, wherein a connection to determine whether an update (e.g., a driver or software component) is available online is no longer necessary during detection time. Information stored for updates corresponding to driver and other software component detection is locally cached, whereby update information is available when no connection exists, eliminating potentially wasted connections and being particularly advantageous if occurring before the connection can be made. When a device is installed or software components are detected, instead of requiring a connection to enable updates, the cached information is evaluated to determine whether the update is available online. If so, the update is made when a connection is made and otherwise desired by the user. The user may defer making the connection, and the update may happen automatically and/or in the background on the next connection.

30 Claims, 7 Drawing Sheets

U.S. PATENT DOCUMENTS

| | | | |
|---|---|---|---|
| 5,442,771 A * | 8/1995 | Filepp et al. | 709/219 |
| 5,473,772 A | 12/1995 | Halliwell et al. | |
| 5,495,411 A | 2/1996 | Ananda | |
| 5,528,490 A | 6/1996 | Hill | |
| 5,548,645 A | 8/1996 | Ananda | |
| 5,586,304 A | 12/1996 | Stupek, Jr. et al. | |
| 5,586,322 A | 12/1996 | Beck et al. | |
| 5,654,901 A | 8/1997 | Boman | |
| 5,793,970 A * | 8/1998 | Fakes et al. | 709/216 |
| 5,845,077 A | 12/1998 | Fawcett | |
| 5,881,292 A * | 3/1999 | Sigal et al. | 717/170 |
| 5,896,523 A * | 4/1999 | Bissett et al. | 713/400 |
| 5,909,581 A | 6/1999 | Park | |
| 5,922,072 A | 7/1999 | Hutchinson et al. | |
| 5,930,513 A | 7/1999 | Taylor | |
| 5,944,821 A * | 8/1999 | Angelo | 713/200 |
| 5,999,740 A | 12/1999 | Rowley | |
| 6,000,000 A | 12/1999 | Hawkins et al. | |
| 6,047,129 A | 4/2000 | Frye | |
| 6,049,671 A | 4/2000 | Slivka et al. | |
| 6,073,214 A | 6/2000 | Fawcett | |
| 6,085,333 A * | 7/2000 | DeKoning et al. | 714/7 |
| 6,125,388 A * | 9/2000 | Reisman | 709/218 |
| 6,148,349 A * | 11/2000 | Chow et al. | 710/33 |
| 6,151,643 A | 11/2000 | Cheng et al. | |
| 6,167,567 A | 12/2000 | Chiles et al. | |
| 6,199,204 B1 | 3/2001 | Donohue | |
| 6,202,207 B1 | 3/2001 | Donohue | |
| 6,212,632 B1 * | 4/2001 | Surine et al. | 713/2 |
| 6,256,668 B1 | 7/2001 | Slivka et al. | |
| 6,269,456 B1 | 7/2001 | Hodges et al. | |
| 6,286,138 B1 | 9/2001 | Purcell | |
| 6,327,617 B1 | 12/2001 | Fawcett | |
| 6,330,715 B1 | 12/2001 | Razzaghe-Ashrafi | |
| 6,347,398 B1 | 2/2002 | Parthasarathy et al. | |
| 6,425,126 B1 | 7/2002 | Branson et al. | |
| 6,490,722 B1 | 12/2002 | Barton et al. | |
| 6,493,871 B1 | 12/2002 | McGuire et al. | |
| 6,557,054 B2 | 4/2003 | Reisman | |
| 6,574,657 B1 | 6/2003 | Dickinson | |
| 6,581,159 B1 * | 6/2003 | Nevis et al. | 713/2 |
| 6,618,735 B1 * | 9/2003 | Krishnaswami et al. | 707/203 |
| 6,643,506 B1 | 11/2003 | Criss et al. | |
| 6,651,249 B2 | 11/2003 | Waldin et al. | |
| 6,668,289 B2 | 12/2003 | Cheng et al. | |
| 6,711,557 B1 * | 3/2004 | Palaniappan | 706/45 |
| 6,738,799 B2 | 5/2004 | Dickenson | |
| 6,751,794 B1 | 6/2004 | McCaleb et al. | |
| 6,757,696 B2 | 6/2004 | Multer et al. | |
| 6,763,403 B2 | 7/2004 | Cheng et al. | |
| 6,820,259 B1 | 11/2004 | Kawamata et al. | |
| 6,907,603 B2 | 6/2005 | Scott | |
| 6,966,058 B2 | 11/2005 | Earl et al. | |
| 6,968,550 B2 | 11/2005 | Branson et al. | |
| 6,973,647 B2 | 12/2005 | Crudele et al. | |
| 7,035,878 B1 | 4/2006 | Multer et al. | |
| 7,035,912 B2 | 4/2006 | Arteaga | |
| 7,051,327 B1 | 5/2006 | Milius et al. | |
| 7,115,919 B2 | 10/2006 | Kodama | |
| 7,257,649 B2 | 8/2007 | Rabbers et al. | |
| 2002/0078142 A1 | 6/2002 | Moore et al. | |
| 2003/0159136 A1 | 8/2003 | Huang et al. | |
| 2004/0255291 A1 | 12/2004 | Sierer et al. | |
| 2005/0050142 A1 | 3/2005 | Capone et al. | |
| 2005/0132348 A1 | 6/2005 | Meulemans et al. | |
| 2005/0132349 A1 | 6/2005 | Roberts et al. | |
| 2006/0282834 A1 | 12/2006 | Cheng et al. | |

OTHER PUBLICATIONS

Cybermedia Meeting Report, Dec. 11, 1997, Davidson.*

"Improve Performance, Prevent Crashing" InfiniSource, Nov. 1999, Sandra Underhill.*

"Oil Change" 1998.*

Cohen et al., "Connection Caching", *Conference Proceedings of the Annual ACM Symposium on Theory of Computing*, pp. 612-621 (1999).

Kinawa et al., "Lookahead Scheduling Requests For Efficient Paging", *Algorithms and Theory of Computing*, No. 1041, pp. 27-34 (1998).

Ssu, Kuo-Feng; Jiau, H.C. "Online Non-stop Software Update Using Replicated Execution Blocks," Department of Electrical Engineering, National Cheng Kung University, Tainan; 2000, pp. 319-324.

Yajnik, S.; Huang, Y.; "STL: A Tool for On-line Software Update and Rejuvenation," AT&T Bell Laboratories, Murray Hill, NJ; Nov. 2-5, 1997; p. 258.

Frieder, O. et al. "Dynamic Program Modification in Telecommunications Systems," Software Engineering for Telecommunication Switching Systems, Seventh International Conference; Jul. 3-6, 1989; pp. 168-172.

Gumbold, M. "Software Distribution by Reliable Multicast," Local Computer Networks, 1996, Proceedings 21st IEEE Conference; Oct. 13-16. 1996; pp. 222-231.

Mori et al. "Superdistribution: The Concept and the Architecture," The Transaction of the Ieice, vol. E73, No. 7; Jul. 1990; pp. 1133-1146.

Williams, Sara. "Internet Component Download," Microsoft Interactive Development, Summer, 1996, pp. 49-52.

Rozenbilt, Moshe. "O,A & M Capabilities for Switching Software Management," IEEE Global Telecommunications Conference, 1993, pp. 357-361.

YUM Howto, YUM, Apr. 2003, [9 pages]. Available at: http://www.phy.duke.edu/~rgb/General/yum_HOWTO/yum_HOWTO/yum_HOWTO-1.html#ss1.2.

Brown, Robert G. And Pickard, Jonathan. YUM (Yellowdog Updater, Modified) HOWTO[online]. Sep. 24, 2003, [retrieved Sep. 20, 2007}, pp. 1-54. Retrieved from: http://www.phy.duke.edu/~rgb/General/yum_HOWTO/yum_HOWTO/yum_HOWTO.html.

A cooperative approach to support software deployment using the Software Dock Hall, R.S.; Heimbigner, D.; Wolf, A.L. 1999 pp. 174-183, IEEE.

A technique for dynamic updating of Java softwareOrso, A.; Rao, A.; Harrold, M.J. Software Maintenance, 2002. Proceedings. International Conference on 2002 pp. 649-658, IEEE.

Jensen, Robert et al. Configuring an ATi card using YUM and the LIVNA Repository [online]. Fedora Solved: A Community Site by Fedora Unity, Last updated Apr. 27, 2007 [retrieved Sep. 20, 2007], pp. 1-4. Retrieved from: http://fedorasolved.org/video-solutions/ati-yum-livna/.

Microsoft Computer Dictionary, Microsoft Press, 2002, p. 129.

Office Action mailed Oct. 16, 2007 from U.S. Appl. No. 10/737,726, filed Dec. 15, 2003.

Final Office Action mailed Dec. 13, 2007 from U.S. Appl. No. 10/737,708, filed Dec. 15, 2003.

Office Action mailed Mar. 22, 2007 from U.S. Appl. No. 10/737,708, filed Dec. 15, 2003.

PocketSoft: RtPatch Software [online]. [Retrieved on Sep. 21, 2007], pp. 1-21. Retrieved from: http://rtpatch.com/.

STL L a tool for on-line software update and rejuvenation, Yajnik, S.; Huang, Y., Nov. 1997, p. 258, IEEE.

Toaster Sample Drivers in the Driver Development Kit. Microsoft Corporation, White Paper, Oct. 20, 2003, pp. 1-18.

Final Office Action mailed Apr. 16, 2008 from U.S. Appl. No. 10/737,726, filed Dec. 15, 2003.

International Search Report and Written Opinion from International Application No. PCT/US04/23965.

Office Action mailed May 30, 2008 from U.S. Appl. No. 10/737,708, filed Dec. 15, 2003.

Notice of Allowance mailed Sep. 23, 2008, for U.S. Appl. No. 10/737,726, filed Dec. 15, 2003.

* cited by examiner

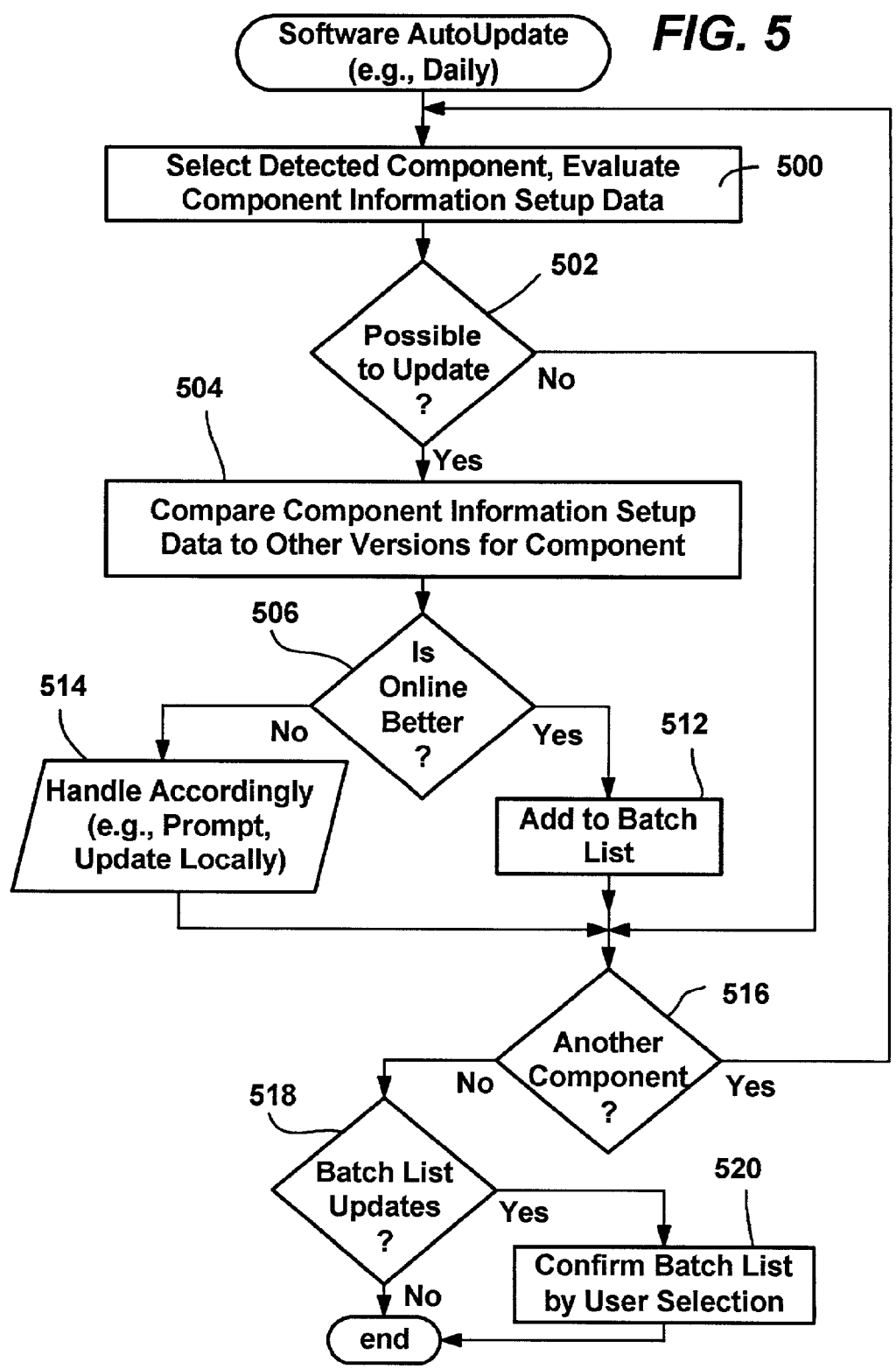

METHOD AND SYSTEM FOR ENABLING OFFLINE DETECTION OF SOFTWARE UPDATES

FIELD OF THE INVENTION

The present invention is generally directed to computer systems, and more particularly to updating software modules such as device drivers and software components on a computer system.

BACKGROUND OF THE INVENTION

Computer users running contemporary operating systems are able to download software updates, such as device drivers for hardware devices and updated software components, from the Internet. For example, when a user installs a new hardware device on the computer, the driver on the local machine can be updated to a more recent version if that device has an updated driver available on a website. Similarly, if an operating system or application has an updated set of one or more software components available for it, that set can be downloaded to update the operating system or application.

However, while such Internet-based updating of drivers and other software components makes it far easier for a user to obtain updates, this model depends on users being connected to the Internet (online) at the time of detection. While it is sometimes possible to prompt an offline user to make a connection in order to look for a possible update, or to automatically initiate a connection on behalf of the user, such an act is an interruption to the user. Moreover, the connection may be wasted, such as when the connection is made but no updated device driver or software component is found online. As can be appreciated, unnecessarily interrupting a user, whether by prompting the user with an option to make an Internet connection, or by forcing the connection, results in a frustrating user experience. The user experience becomes even worse when, after the connection is made, it is determined that no online update exists and thus the interruption was pointless. An unwanted or unnecessary connection also unnecessarily wastes server resources.

Moreover, even when an update may be available and wanted, it may not be possible to make a connection. For example, certain operating system components need to be installed prior to making some types of connections. For example, if device detection takes place before loading of these needed operating system components, (as it does during normal booting operations), the device will be detected but it will not be possible to make the connection, and any desired driver updates will need to be remembered by the user and manually downloaded when the user later connects.

SUMMARY OF THE INVENTION

Briefly, the present invention provides a method and system wherein a connection is no longer necessary during the time of detection to determine whether a software update (e.g., a driver or software component) is available online. To this end, once the computer system has previously been connected to the Internet, (or the like, such as an appropriate set of servers in an Intranet), the information stored for driver and other software component detection is locally cached, whereby the update information is available when no connection exists. The offline information may be used to determine a user's desired updates, which are then automatically handled when the user does make a connection.

As a result of the cached update information in the offline cache, no new connection needs to be established when a device is installed, which eliminates potentially wasted connections, and is also particularly advantageous if the device is being installed before the connection can be made. Instead of requiring a connection to enable the update, the user makes a connection only when applicable updates are available, and only when and if otherwise desired. For example, the user is prompted to make a connection to the Internet only after there has been local confirmation that the desired update is indeed available on the server, (wherein as used herein and throughout the application, the term "desired" with respect to an update generally refers to the update being more appropriate for the user than any other update that was found), and that the user has indicated that the update should be installed. The user may defer making the connection, and the update can happen automatically and/or in the background on the next connection. If the machine state changes before a connection is made so that an update is no longer applicable, the offline cache can be used to give the user correct information regarding the status of updates without requiring the user to reestablish connectivity.

A special cache may be used for storing the update information offline, so that background downloading is possible, and the special cache content is not subject to expiration, flushing and/or size requirements that may render the update information unavailable.

The present invention works with both hardware-related updates, e.g., device drivers, and software-related updates, e.g., a component or package of components such as an operating system component update. In one implementation, hardware information for hardware-related updates is efficiently tracked by the use of a bitmask and set of files that contain information about hardware devices. In this implementation, the appropriate bit in the bitmask is determined by a hash of the hardware device identifier (hardware ID). If the corresponding bit is set, a file exists that may include information about an update to the particular hardware device. The information may be organized into records that identify things such as whether an online driver exists for the device, and if so, what its version number is, so that other detected versions of that driver (e.g., on a local hard drive) can be compared against the online version to determine which is the most-recent version and/or the "best match." For example, when no driver is installed, there may be a local driver available, but it may be a "generic" driver (e.g. a VGA Display driver). The online driver may not be more recent, but may be more specific, (e.g. something specifically provided by the manufacturer of the particular device for that device), and therefore may be determined to be a better match. In the case of software updates (i.e., non-driver updates), the most-recent update is essentially always used.

For software-related components, a component information setup file is requested from the server and locally cached. Note that for privacy reasons, the particular component information setup file that is requested may be determined at the client-side, based on platform, locale, machine specifics and so forth. The cached component information setup file is accessed and maintained by local automatic update software to determine what software components are already installed, cannot be installed (e.g., due to conflicts) and/or are dependent upon detection of an existing installation of other software. Based on the data in the component information setup file, the automatic update software allows the user to select appropriate updates, remembers which components are selected, and updates those components the next time the computer is connected to the Internet.

Other advantages will become apparent from the following detailed description when taken in conjunction with the drawings, in which:

BRIEF DESCRIPTION OF THE DRAWINGS

FIG. 5 is a flow diagram generally representing actions taken to use the offline cached information to handle updates to software components in accordance with an aspect of the present invention.

DETAILED DESCRIPTION OF THE PREFERRED EMBODIMENT

EXEMPLARY OPERATING ENVIRONMENT

Figure 1:
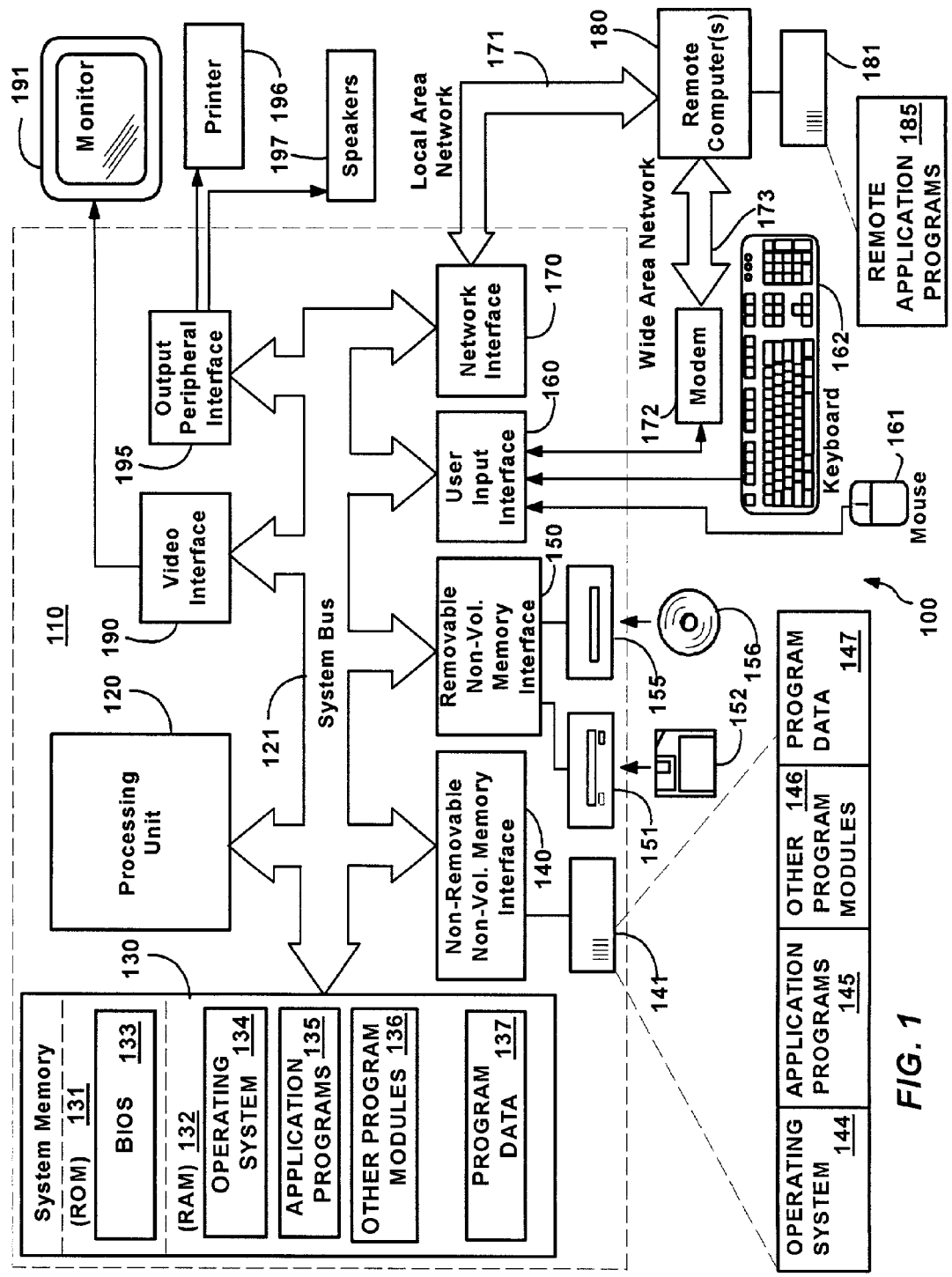
FIG. 1 is a block diagram representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

OFFLINE DETECTION OF SOFTWARE UPDATES

Figure 2:
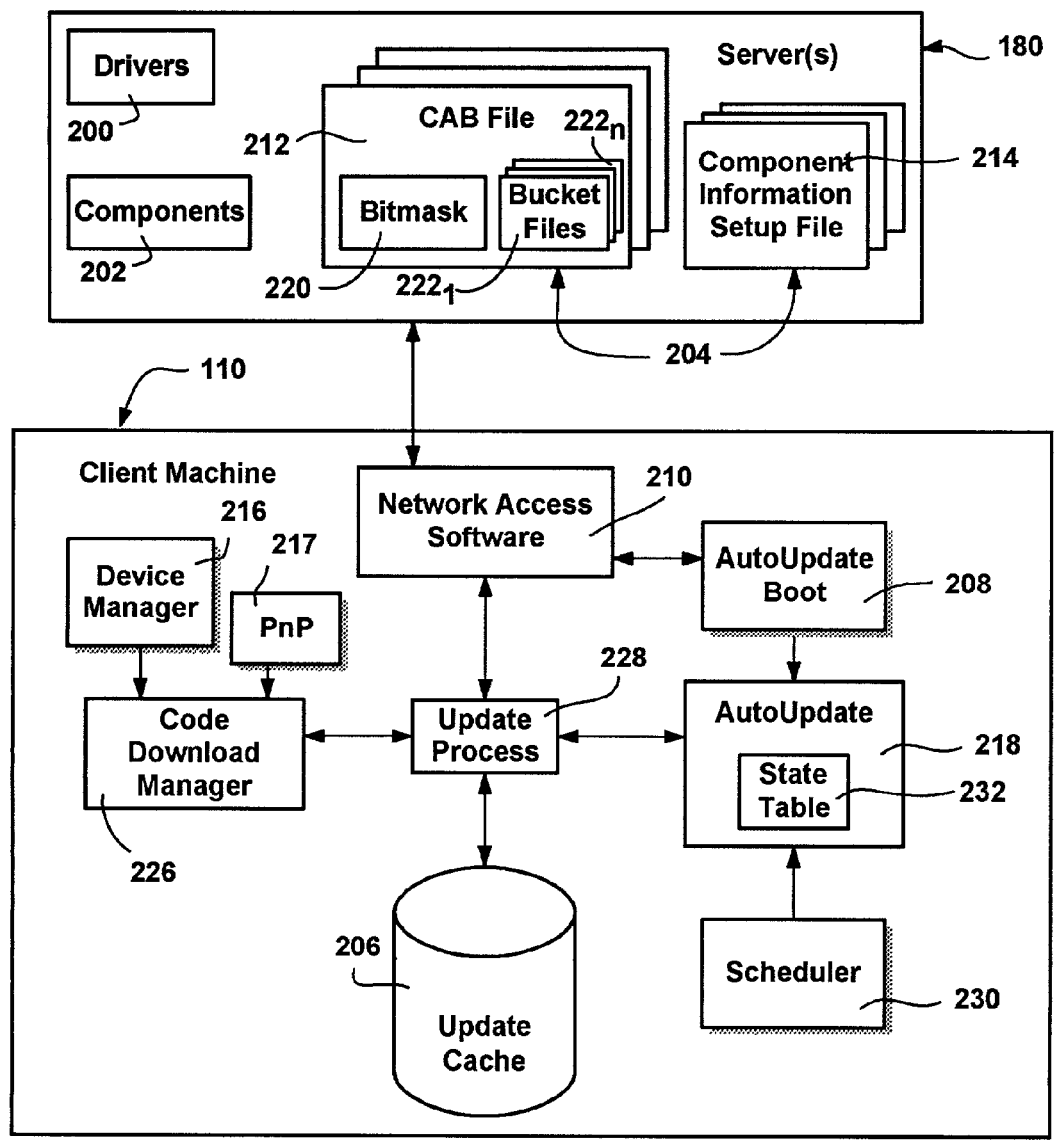
FIG. 2 is a block diagram generally representing exemplary components for handling updates using offline information in accordance with an aspect of the present invention.

As generally represented in FIG. 2, a computer system such as the computer system 110 (OF FIG. 1) acts as a client system and connects to a remote computer such as the remote computer 180 (OF FIG. 1), wherein the remote computer 180 comprises generally at least one server. In one implementation, the remote computer 180 is an HTTP server, however as will be understood, the remote computer 180 can be any device or interconnected devices capable of storing information and processing requests for that information, such as one or more file, FTP, or other servers.

In general, the server (or servers) 180 maintains software that the client system 110 may want to download, including device drivers 200 and software components 202 (e.g., binary executables, DLLs, object classes, ROM updates, microcode patches, data such as antivirus information and so forth). As is known, such software is frequently updated (or at least made available a first time), and thus placing the software on a server which can be accessed by many potential clients (e.g., via an Internet website) is a desirable way to distribute the updates. As used herein, the term "update" (and its variations such as "updates") will be intended to include any software that is accessible to clients, whether or not the software is actually an update or an initial version that may or may not someday have a later version.

Figure 3:
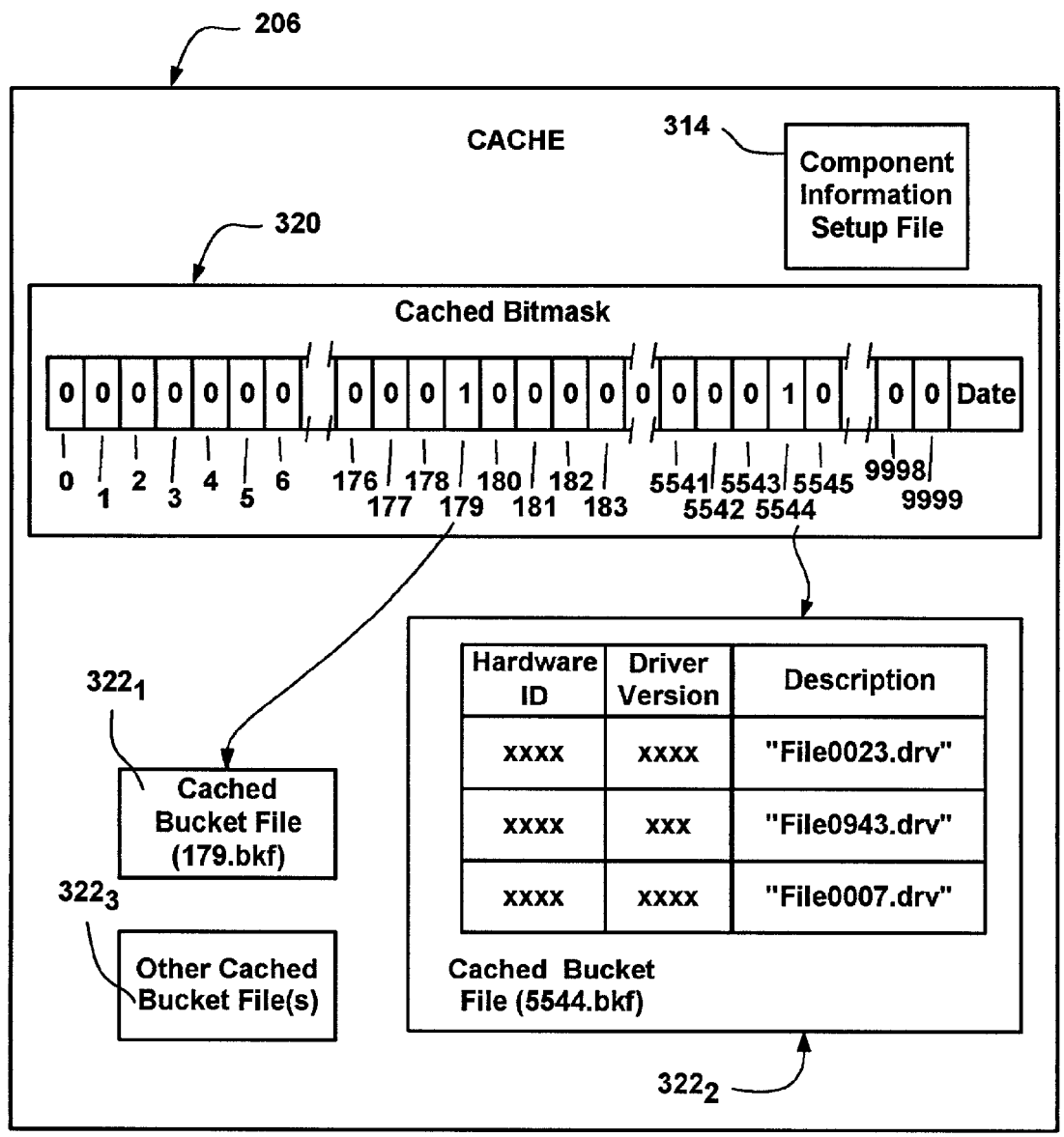
FIG. 3 is a block diagram generally representing information maintained in an offline cache for facilitating updates in accordance with an aspect of the present invention.

In accordance with one aspect of the present invention, the first time that a client 110 connects to the server 180, e.g., by connecting to the Internet, the client 110 downloads information from the server 180 that is relevant to available updates. This update information 204 is cached in a client cache 206, as generally shown in FIGS. 2 and 3 and described below. Thereafter, each time the client 110 connects to the server 180, the server 180 may adjust the cached update information, that is, the server 180 may update the update information in the update cache 206. Note, however that preferably, the server does not initiate the refreshing of the cache, but rather the client requests the update/refresh from the server, e.g., first the client checks to see whether the server information is newer, and if so, requests the actual information from the server. The offline update cache 206 may comprise a special cache which may be used for storing the update information offline, so that the cached content is not subject to expiration, flushing and/or size requirements (as with conventional caches) that may render the update information unavailable.

Note that the server (e.g., having an update website) may be automatically connected to in the background, (e.g., while the user is accessing other Internet sites), and that the initial and subsequent downloading may take place in the background, generally using unused bandwidth, without the user specifically requesting the download. For example, AutoUpdate Boot software 208 can connect to the server and the update website via network access software 210, (e.g., wininet.dll called directly) to access the internet/network and manage the initial update information download and subsequent changes thereto. In addition to the update information, the drivers 200 and software components 202 that the update information identifies as available can also be downloaded in the background when updates therefor are appropriate.

Moreover, the download may be such that it can be incrementally stopped and restarted without losing data that has already been successfully downloaded. Such background and safely interruptible downloading that is suitable for use by the present invention is generally described in U.S. patent application Ser. No. 09/505,735 filed Feb. 16, 2000 entitled "System and Method for Transferring Data Over a Network" assigned to the assignee of the present invention and herein incorporated by reference. Further, note that once initially downloaded to the cache 206, subsequent downloads need not transmit the entire set of update information, but rather the downloading can be somewhat reduced by selectively downloading relevant change information (i.e., the deltas) when appropriate, thereby increasing efficiency, as described below.

To download, notification of connectivity to the Internet is given to the components that request the information for offline caching. To this end, the automatic updating feature of the present invention uses an operating system extension that periodically calls application programming interfaces (APIs) to get information about the connectivity state of the machine. If a connection is determined to be available, the other components are notified that a download is now possible. For example, this check may occur approximately every ten minutes when the user is running the system shell.

Once notified of a connection, the AutoUpdate boot loader 208 component of the automatic updating feature checks to see if newer information is available on the server 180. Note the first time this check is made, no information is available locally, and the update information is therefore automatically downloaded to the cache 206. As described above, when downloading, the AutoUpdate boot loader 208 component may use available background download functionality to download information about the device drivers available on the update website. This information is then stored in the cache 206 and is updated whenever newer information is published on the update website and a connection is available for the download.

Once initially downloaded, for hardware-related updates, the device manager 216 and code download manager 226 will now have this information locally available whenever new device detection is done, e.g., when the user installs a new device. Similarly, for software related updates, the AutoUpdate software 218, which may comprise the operating system's detection and installation engine, detects the availability of new software updates in a similar fashion, by downloading the appropriate component information setup file 214 from the update website, and reading it locally. If this process determines an update is available for the client machine 110, the user may be presented with an option to download and install the update. As can be appreciated, this is preferable to downloading an entire update (or set of updates) that may not apply to the user's machine. In addition to handling non-persistent or intermittent connectivity, the updating feature may be rescheduled to a more convenient time for the user. If the user is not connected at this time, connectivity can be forced, or the update can fail. Preferably, however, if the user is not connected at the time of a scheduled update, the mechanism waits until the user reconnects, (which is slightly different than forcing, failing or rescheduling). With the caching technique of the present invention, the necessary information is persisted (and protected from expiration or flushing) so that the user can be reminded, on schedule, without any connection. Once connectivity is reestablished, the updating/downloading can resume as needed.

Thus, once the appropriate update information 204 for a given machine as requested by the client is downloaded to the cache 206, the client machine 110 is capable of handling updates regardless of whether the client machine 110 is connected to the server 180, and even before it can connect. While capable of operating before a connection can exist, it should be reiterated that the present invention may also operate when a connection can exist but does not, or when a connection does exist. Although the actual updates themselves may not take place until a later connection is available, the resulting user experience is generally consistent and appropriate, in that a prompt, dialog box or the like for selectively installing online updates will appear only when online updates are actually available. Note that prompting is optional and only provided for user convenience. Also, since the connection is not required for handling updates, automatic device detection, such as via a device manager component 216 or Plug and Play (PnP) component 217, or via a software updating service (AutoUpdate software) 218, (that may execute before a connection is even possible), are able to prepare for updates when a connection is later made. When later connected, the preparation ensures that the updates are automatic, without needing manual user intervention.

Thus, if a user installs a new device at anytime, the present invention enables a hardware driver to be installed for that device from the online server 180, either on demand if a connection exists, or at a later time if no connection exists. This requires that the hardware driver exist on the server 180, which is one piece of data that the cached update information maintains, as described below. Thus, if the driver does exist and is the best available version, (which also can be determined from the cached update information), and a connection is present, the driver can be downloaded and installed on demand. However, if no connection exists, the driver download information can be persisted so that the driver can be installed when there is a connection, or the user may be prompted . . . . If the machine state changes before a connection is made so that an update is no longer applicable, the update information in the offline cache 206 can be used to give the user correct information regarding the status of updates.

As represented in FIG. 2, the hardware information in a CAB (cabinet) file (e.g., the CAB file 212) includes a bitmask 220 and bucket files $222_1$–$222_n$. The bitmask 220 and each bucket file (e.g., the CAB file $222_1$) can be separately downloaded, such as based on a datestamp therein or otherwise accompanying the file (as metadata) so that only a changed bitmask or a changed or new bucket file need be downloaded. The component information setup file 214 is relatively small and is thus downloaded in its entirety, which in general is each time that there is a connection. However, as can be appreciated, the component information setup file 214 alternatively may be downloaded only if changed, and/or only changes from a previous component information setup file may be downloaded depending on efficiency considerations and the like.

Figure 4:
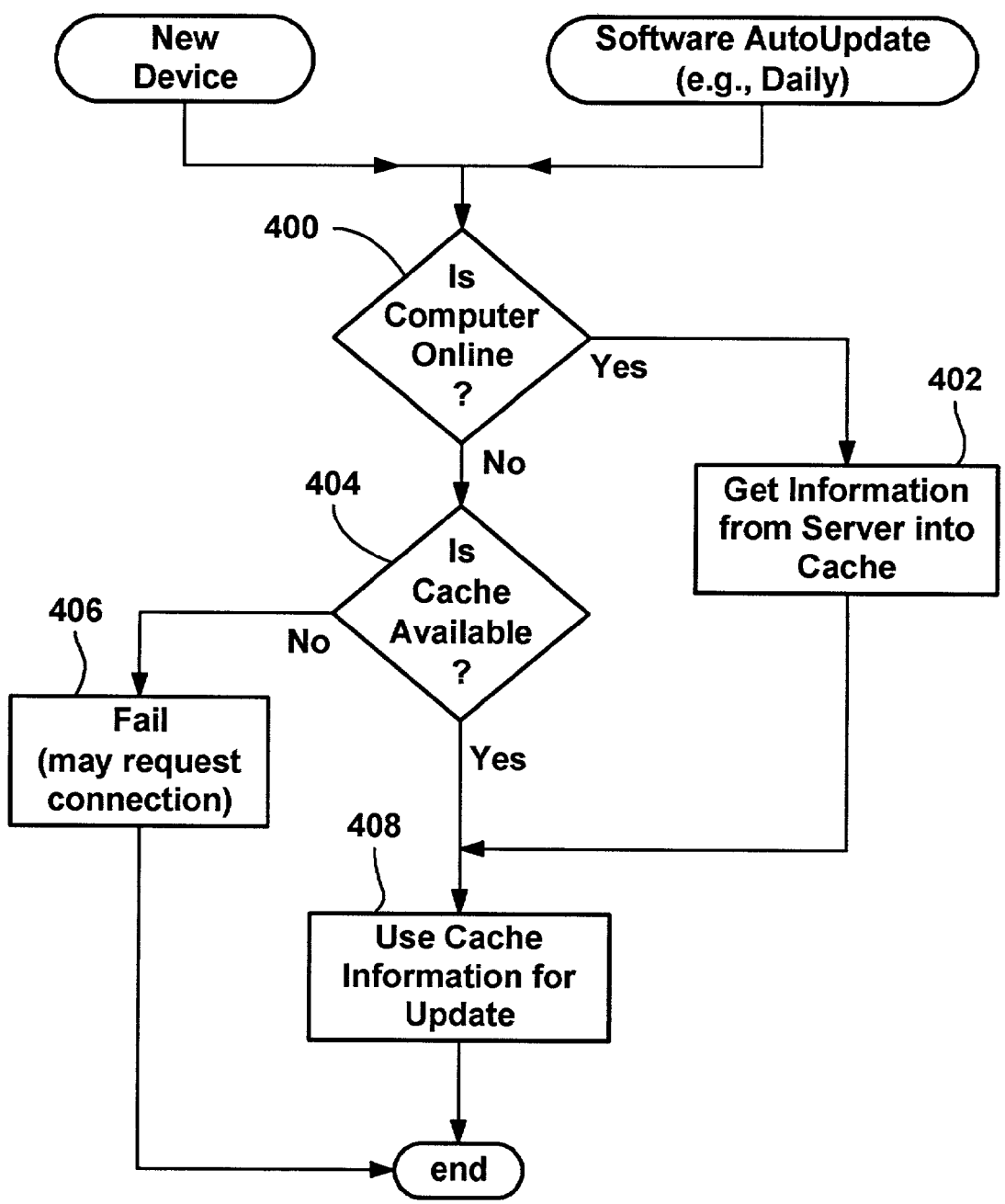
FIG. 4 is a flow diagram generally representing actions taken to handle updates using offline information in accordance with an aspect of the present invention.

When cached, as shown in more detail in FIG. 3, a code download manager 226 of FIG. 2, that may be called by the device manager 216 component or PnP component 217 upon detection of a device (or devices), will use the bitmask 320 and bucket files $322_1$–$322_n$ to evaluate the availability of online updates for hardware drivers for that device. As generally described above, this can be automatic at each startup, in response to a plug and play request, in response to a manual user request to add a new device or update a driver, or in some other manner. An update process 228, described below with respect to FIG. 4, will be executed to use the information in the update cache 206 to determine the availability of a suitable update. Note that while separately shown in FIG. 2, the update process 228 may be incorporated into the code download manager 226 and the AutoUpdate software 218.

To efficiently maintain information about the many possible hardware devices capable of being installed in a system, each bit in the bitmask 320 indicates whether a bucket file exists that may have information about a particular hardware device. More particularly, when the update data 204 is configured at the server-side, the ID of any hardware device (of which an extremely large number may be possible) is hashed down to a smaller number, for example, a single value within a range of ten thousand possible numbers (0 to 9999). If a hardware driver update is available for that hardware device, a bucket file is created, (if one is not already present for that hashed value), and the correspondingly numbered bit in the bitmask is set (if not already set because the bucket file already existed). The actual hardware ID is placed in the bucket value, along with data about the driver, including version information such as a date stamp, and description information, such as the filename. The records within the bucket files can be arranged as desired, e.g., for fast searching, or simply by appending new hardware driver records thereto as new driver updates become available. For convenience, the bucket files are named by their hashed value, although if desired a map could map the hashed value to another filename.

Thus, as shown in FIG. 3, when downloaded into the client-side update cache 206, via the bitmask 320, the code download manager 226 of the client machine 110 can quickly and efficiently identify whether a given hardware device possibly has an update therefor by performing the same hash function as the server does for hardware device IDs. If an update possibly exists, the bit corresponding to that hash value will be set and the corresponding bucket file (normally) will be present locally. The bucket file can be searched for the full identifier of the hardware device, which will be present along with update data if an update is available.

By way of example, consider a hardware device that hashes to the value "182" in FIG. 3. The bitmask 320 specifies (by the zero value at bit offset 182) that no bucket file exists and thus no device driver update is available online for this hardware device. Instead, as described below, the code download manager will attempt to locate a driver elsewhere, e.g., by performing actions to ask the user to load a disk. If however a different hardware device with an ID that hashes to the value "5544" in FIG. 3 is installed, there is a bucket file 322$_2$ (5544.bkf) for that hashed value as indicated by the bit set to one at offset 5544 in the bitmask 320. The bucket file is then opened (unless already open) and read to determine whether the specific hardware ID is listed therein. If not, then no update is available, but if listed, the device driver information is read and used in determining whether an update should be planned for that driver. The use of the update information for a hardware device is described below with respect to FIGS. 6A–6B. Note that in keeping with the present invention, the online availability of the driver (as least since the computer was last connected) is determined from the cached update data, regardless of whether there is an actual connection. Note however, whenever a connection is available, information from the server is used if it is newer, i.e., whenever a connection is available, the server is checked for newer detection information before deferring to the offline cached information. When online, the bitmask and any needed or changed bucket files may be downloaded as needed, e.g., when the bitmask date stamp indicates that the cached bitmask is outdated.

For updates to software components, the AutoUpdate software 218 is executed from time to time, such as daily or in accordance with some other settings, such as via a task scheduler 230 or the like. Software updates are based on cached information in the downloaded copy of the component information setup file 314. When the AutoUpdate software 218 is considering whether a software component should be installed or updated, the AutoUpdate software 218 accesses the cached component information setup file 314 to determine whether a software component is already installed, whether it cannot be installed, or whether it requires another software component to be installed before it can be installed. For example, an updated component may be available, but only applicable if a certain version of Microsoft® Internet Explorer is present, and the updated component's installation is thus detection dependent. The component information setup file 314 may list such requirements for each given software component or package of components.

After determining what updates, if any, are available, the AutoUpdate software 218 obtains a decision from the user on whether to download and install the update. If the user elects the installation for a given update, the AutoUpdate software 218 persists the installation request in a state table 232 or the like. The state table 232 is accessed when the client computer 110 is loaded, which is when the shell is loaded, at which time the AutoUpdate and AutoUpdate boot components 208 and 218 appropriately handle the update based on conditions. For example, when the AutoUpdate and AutoUpdate boot components 208 and 218 determine a state where connectivity is not needed, e.g., when installing an update locally, then the event happens as scheduled, independent of connectivity. Also, the AutoUpdate and AutoUpdate boot components 208 and 218 may periodically check for a connection to the Internet, whereby when a download is needed and connectivity is detected, the download of the update may happen in the background, as described above.

In general, the offline mode of operation saves the inconvenience and expense of connecting (e.g., to the Internet) if there are no updates available or the user chooses not to select/install an available update. Also, in the event of installing a new device, if the device is discovered during a restart of the system, depending on the method used to connect, it is not always possible to establish the connection, which requires the user to remember to update at a later time. The offline operation of the present invention enables the updating feature to automatically remember and handle the update when a connection is later made.

Turning to an explanation of the operation of the present invention with particular reference to the flow diagrams of FIGS. 4, 5 and 6A–6B, the update process 228 (FIG. 2) is called at the various times described above, e.g., upon detection of a new device via the code download manager 226 or when software components are checked (e.g., daily) via the AutoUpdate software 218. When called, the update process 228 checks at step 400 of FIG. 4 whether the computer is online, e.g., connected to the Internet as described above. If so, the update process branches to step 402 to get the latest update information 204 from the server into the cache 206. Note that as described above, this may be less than a full download depending on the current state of the information in the cache 206.

If the computer system is not online, the existence and contents of the cache 206 are checked. The cached content may not be available if the user has not previously connected to the Internet, or if the user has somehow deleted it or its contents. In such an event, the process fails as represented by step 406, although the user may be given a chance to connect to the Internet if appropriate, such as if a hardware device was detected at a time when the system is capable of establishing a connection.

Figure 6A:
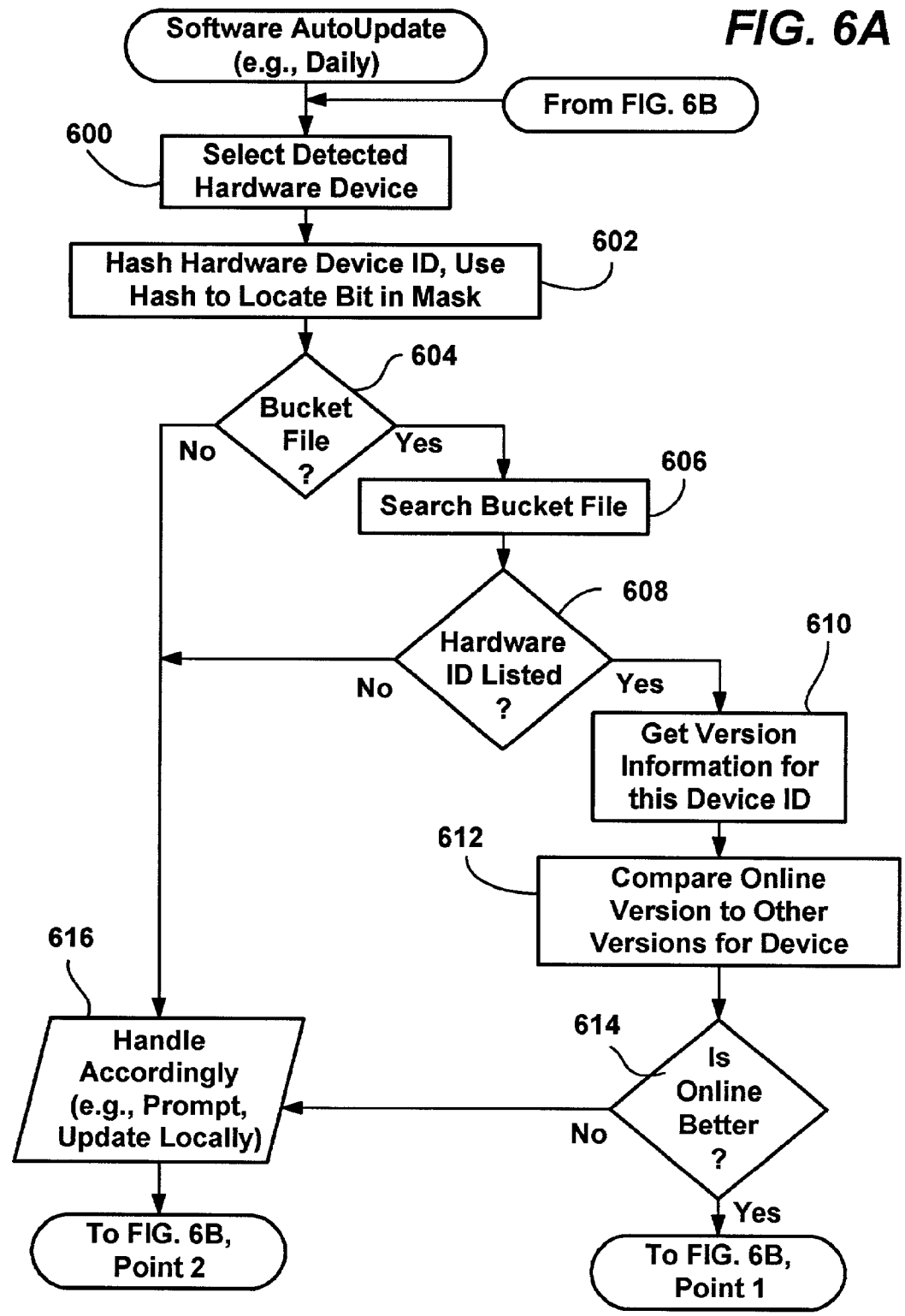
FIGS. 6A and 6B comprise a flow diagram generally representing actions taken to use the offline cached information to handle new hardware devices and possible driver updates therefor in accordance with an aspect of the present invention.
Figure 6B:
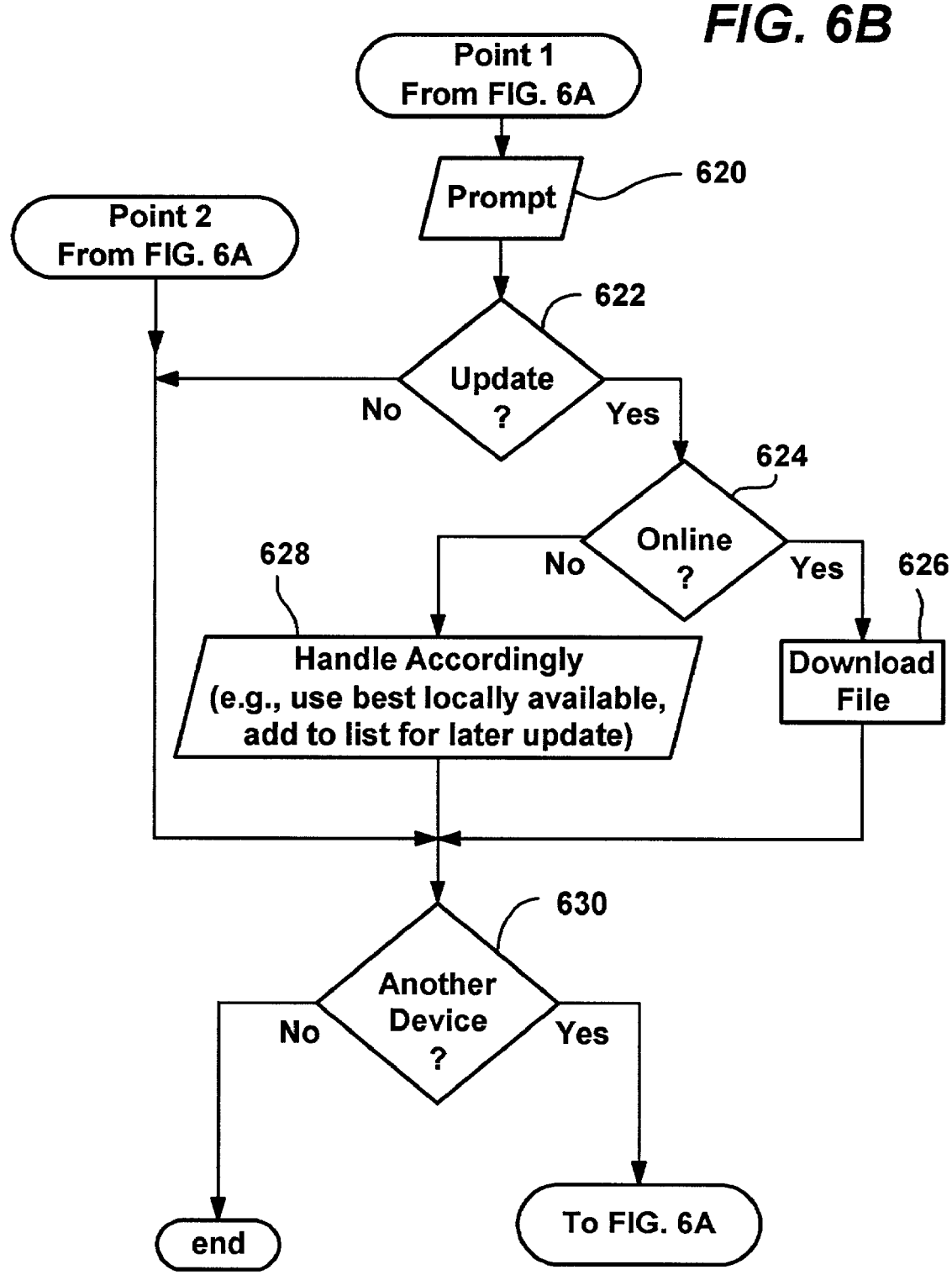

If the cached information is available via step 402 or step 404, the cached information can be used at step 408 to determine updates regardless of whether the system is online, as described above. FIG. 5 provides exemplary steps of how the cached update information can be used for updating a software update, while FIGS. 6A and 6B show one way to use the cached update information for updating a hardware device/driver.

In FIG. 5, at step 500, the AutoUpdate process selects a possibly-needed component, and evaluates its information in the cached component information setup file 314. If at step 502 it is deemed possible and desirable to update, e.g., it is not already installed, not in conflict with other software, and any detection dependencies are satisfied, the process continues to step 504. If the update cannot be installed, (or the same version is already installed), the process branches to step 516 which repeats the process for the next component, if any, until the detected set of software components has been processed.

At steps 504 and 506, the online information for this software component is checked against any locally detected software components of the same name or the like to determine whether the online version is better than any local version. If not better, there is no reason to automatically install the online version, and step 506 branches to step 514 to handle the update accordingly. For example, the user may be prompted to install a newer local version, and the update can be on demand from the local source if the user requests installation. After handling, the update process branches to step 516 to repeat the process for other possible components until the detected set of software components has been processed.

If step 506 determines that the online version is better (newer) than what is locally available and installed, the AutoUpdate process branches to step 512 to add the component information (e.g., an identifier thereof) to a batch list, such as maintained in the state table 232 (FIG. 2). The process continues to step 516 to repeat the process for the next component, if any, until the detected set of software components has been processed.

When no more detected software components remain, the user is allowed to select (or alternatively deselect) software components for online updating based on the batch list. To this end, if the batch list has updates in it at step 518, the process branches to step 520 where the user confirms the update via a checkbox provided in a dialog box or the like for each possible update. As described above, once confirmed, the updates can take place on demand if a connection is present, or the updates can be deferred by persisting the batch list and using it the next time a connection is present.

FIG. 6A shows one way in which a hardware device or set of devices can be similarly processed (e.g., by the code download manager 226) for updating drivers based on information in the cache 206. At step 600, a hardware device is selected, and at step 602 its device ID is hashed to determine the bit in the bitmask 320 that applies to it. Step 604 analyzes the bit value of the corresponding bit to determine whether a bucket file exists for that hardware device. If not, there is no driver therefor available online, and step 604 branches to step 616 to handle the installation accordingly, e.g., by locating a local copy of the hardware driver such as by prompting the user for a file location, or disk/CD-ROM insertion to install a driver for that device if one is needed.

If at step 604 a bucket file is present, then there is a possibility that a downloadable driver exists for this device. Step 606 searches the bucket file (opening it if necessary), to determine whether the hardware ID is listed therein at step 608. If not, then there is no driver therefor available online, and step 608 branches to step 616 to handle the installation accordingly, such as by installing it locally.

If instead the hardware ID is listed, then there is a driver therefor available for download, whereby step 608 branches to step 610 to evaluate the version information (maintained in the bucket file) for this particular device. Steps 612 and 614 represent the comparing of the online driver version to any other, locally available driver versions for this device. If the online version is better at step 614, the process branches to step 620 of FIG. 6B (note that again, any prompting is optional), otherwise the process branches to step 616 to handle the installation accordingly, such as by installing it locally, as described above.

Step 620 of FIG. 6B represents providing a prompt or the like to the user to determine whether the user wants to install the update. If not, the update is bypassed via step 622 by branching ahead to step 630. Note that the user may not be able to use the device if no earlier version driver is already installed for it.

If step 622 determines that the user wants the online update, step 622 branches to step 624 to test whether the system is online. If so, the installation is on demand, by branching to step 626 to install the update. If not online, the process handles the updating as best as possible at step 628, e.g., by using a locally available driver, and persisting the update request for later downloading and installing of the driver when the connection is made. The user may be prompted for instructions (including possibly to establish a connection) as desired.

Step 630 repeats the process for any other devices found, by returning to step 600 until no more detected devices exist.

As can be seen from the foregoing detailed description, the offline caching system and method of the present invention enables remote or online updates (updates from a non-local source) even when the system itself is not connected to the non-local source, deferring requested downloads until the system is online. Installation of an update may occur independent of connectivity. This provides efficiency, a consistent user experience, and facilitates automatic updating.

While the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. A computer-implemented method, comprising:
   at a client computer, obtaining information from a server about the availability of at least one update and storing information about the availability in a first storage location and obtaining information about the unavailability of at least one update and storing the information about the unavailability in a second location;
   storing the information about available and unavailable updates at a local cache on the client computer; and
   in response to a request for update information that may be available at the server, accessing the local cache to retrieve the information about available updates and unavailable updates.

2. The computer-implemented method of claim 1 wherein obtaining the information includes accessing at least one Internet website.

3. The computer-implemented method of claim 1 wherein obtaining the information about available updates from the server includes obtaining data that changes the information about available updates in the local cache.

4. The computer-implemented method of claim 1 wherein storing the information about available updates includes storing data identifying whether a hardware device has a driver available for download from an online site.

5. The computer-implemented method of claim 4 wherein at least some of the data identifying whether the driver is available for download is maintained in a bitmask.

6. The computer-implemented method of claim 5 wherein the bitmask has a bit therein that indicates whether the driver may be available for download from an online site.

7. The computer-implemented method of claim 6 wherein the bit is determined by hashing an identifier corresponding to the hardware device.

8. The computer-implemented method of claim 6 wherein a setting of the bit indicates whether a file containing update information can be locally accessed.

9. The computer-implemented method of claim 8 wherein the bit setting indicates that the file can be locally accessed, and further comprising, accessing the file, and searching for data therein corresponding to the hardware device.

10. The computer-implemented method of claim 8 wherein the data corresponding to the hardware device is present and indicates a version number of an available driver for that hardware device.

11. The computer-implemented method of claim 1 wherein storing the information about available updates includes storing data identifying whether at least one software component is available for download from an online site.

12. The computer-implemented method of claim 11 wherein at least one software component is available, and further comprising storing data identifying whether installation of at least one available software component is dependent on installation of at least one other software component.

13. The computer-implemented method of claim 11 wherein at least one software component is available, and further comprising storing data identifying a version for at least one available software component.

14. The computer-implemented method of claim 1 wherein accessing the local cache to retrieve the information about available updates indicates that an update is available, and further comprising, persisting information about the available update.

15. The computer-implemented method of claim 14 further comprising, downloading updates at a time when a connection exists based on the information persisted about the available update.

16. The computer-implemented method of claim 1 wherein accessing the local cache to retrieve the information about available updates indicates that an update is available, and further comprising, downloading the available update.

17. In a computing device, a system comprising,
network access software configured to access a network;
a cache;
a cache maintenance mechanism connected to the network access software and configured to maintain information in the cache, the information corresponding to available updates maintained on the network stored in a first data storage location and corresponding to unavailable updates not maintained on the network stored in a second data storage location; and
automatic update software connected to access the cache in response to a request for update information on the network, and to determine from the information in the cache whether an update is available or not available.

18. The system of claim 17 wherein the cache maintenance mechanism maintains information in the cache by downloading information into the cache from a network site.

19. The system of claim 17 wherein the request for update information corresponds to a scheduled event.

20. The system of claim 17 wherein the automatic update software locates information about the update to a driver in response to a request for hardware-related updates.

21. The system of claim 20 wherein the information about the update to the driver is included in a bitmask in the cache.

22. The system of claim 20 wherein the information about the update to the driver comprises an online update and is included in a file in the cache.

23. The system of claim 17 wherein the information in the cache further includes driver includes version information for at least some of the available updates.

24. The system of claim 17 wherein the automatic update software determines whether at least one software component is available for download from the network.

25. The system of claim 17 wherein the automatic update software determines that an update is available and persists information corresponding thereto.

26. The system of claim 17 wherein the automatic update software determines that the update is available and downloads the update from the network.

27. A computer storage media having computer executable instructions, comprising,
accessing an online source to obtain information related to available updates and information related to unavailable updates;
caching the information, the information including information as to the availability cached in a first cache storage location and the unavailability of updates cached in a second cache storage location;
receiving a request directed to whether a particular update is available for download from the online source; and
accessing the cache to determine whether the particular update is available or is not available for download from the online source.

28. The computer-storage media of claim 27 wherein the online source is accessed via an Internet site.

29. The computer-storage media of claim 27 wherein the cache indicates that the particular update is available, and further comprising, downloading the update.

30. The computer-storage media of claim 27 wherein the cache indicates that the particular update is available, and further comprising, persisting information corresponding to the update for later download of the update.

* * * * *